United States Patent

[11] 3,587,825

| [72] | Inventor | Fred T. Smith |
| | | Aurora, Ill. |
| [21] | Appl. No. | 789,133 |
| [22] | Filed | Jan. 6, 1969 |
| [45] | Patented | June 28, 1971 |
| [73] | Assignee | Barber-Greene Company |
| | | Aurora, Ill. |

[54] JACKKNIFE TYPE CONVEYOR FOR RECLAIMING MATERIAL
7 Claims, 6 Drawing Figs.

[52] U.S. Cl. .................................................. 198/36, 214/10
[51] Int. Cl. .............................................. B65g 65/28
[50] Field of Search .......................................... 214/10, 152; 198/36, 9, 109; 37/189, 189 (W), 189 (B), 190, 190 (W), 190 (B)

[56] References Cited
UNITED STATES PATENTS

| 517,726 | 4/1894 | Braun | 37/190 |
| 738,013 | 9/1903 | Dodge | 214/10 |
| 802,229 | 10/1905 | Moses | 198/109 |
| 2,665,794 | 1/1954 | Slomer | 198/109 |
| 3,358,855 | 12/1967 | Carlton et al. | 214/10 |

FOREIGN PATENTS

| 1,042,695 | 9/1966 | Great Britain | 214/10 |

Primary Examiner—Gerald M. Forlenza
Assistant Examiner—Frank E. Werner
Attorney—Hill, Sherman, Meroni, Gross & Simpson ABSTRACT: A jackknife conveyor system for transporting material from a material-handling device to a loading conveyor comprises a first conveyor pivotally connected to the second conveyor with the material-receiving ends of the first conveyor being pivotally connected to the material-handling device such as a reclaimer. The discharge end of the second conveyor is located to discharge into a loading conveyor preferably through a surge bin. In operation the two conveyors pivot relative to each other about their point of connection as the reclaimer moves along the pile being reclaimed. The pivotal movement between the conveyors enables relative movement of the reclaimer with respect to the point for discharging the material into a surge bin or onto a fixed loading conveyor.

PATENTED JUN 28 1971

INVENTOR.
Fred T. Smith
BY [signature] ATTORNEYS

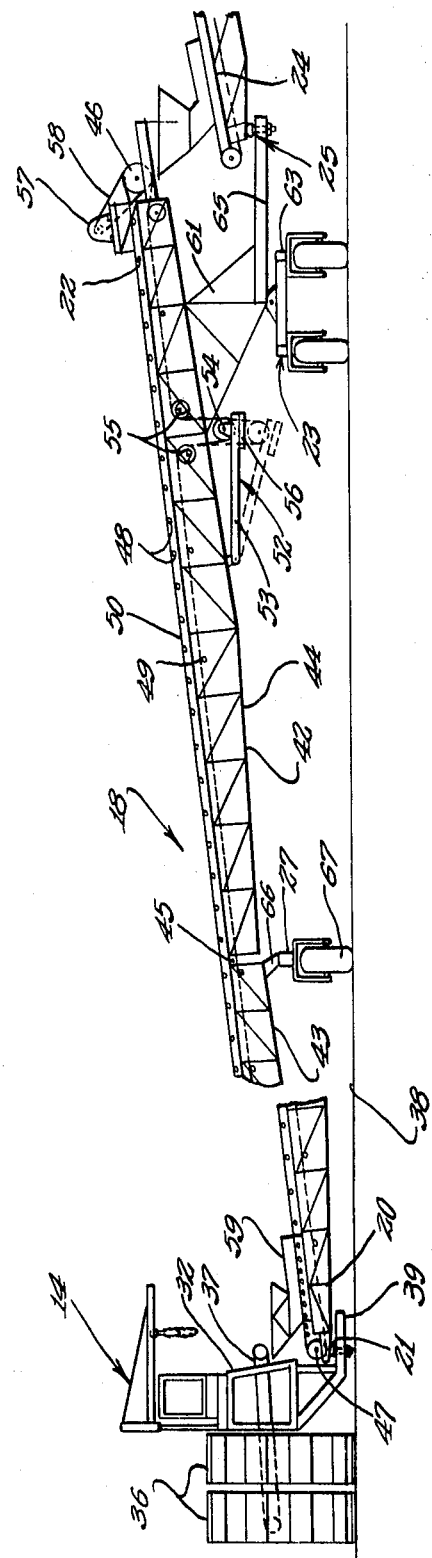

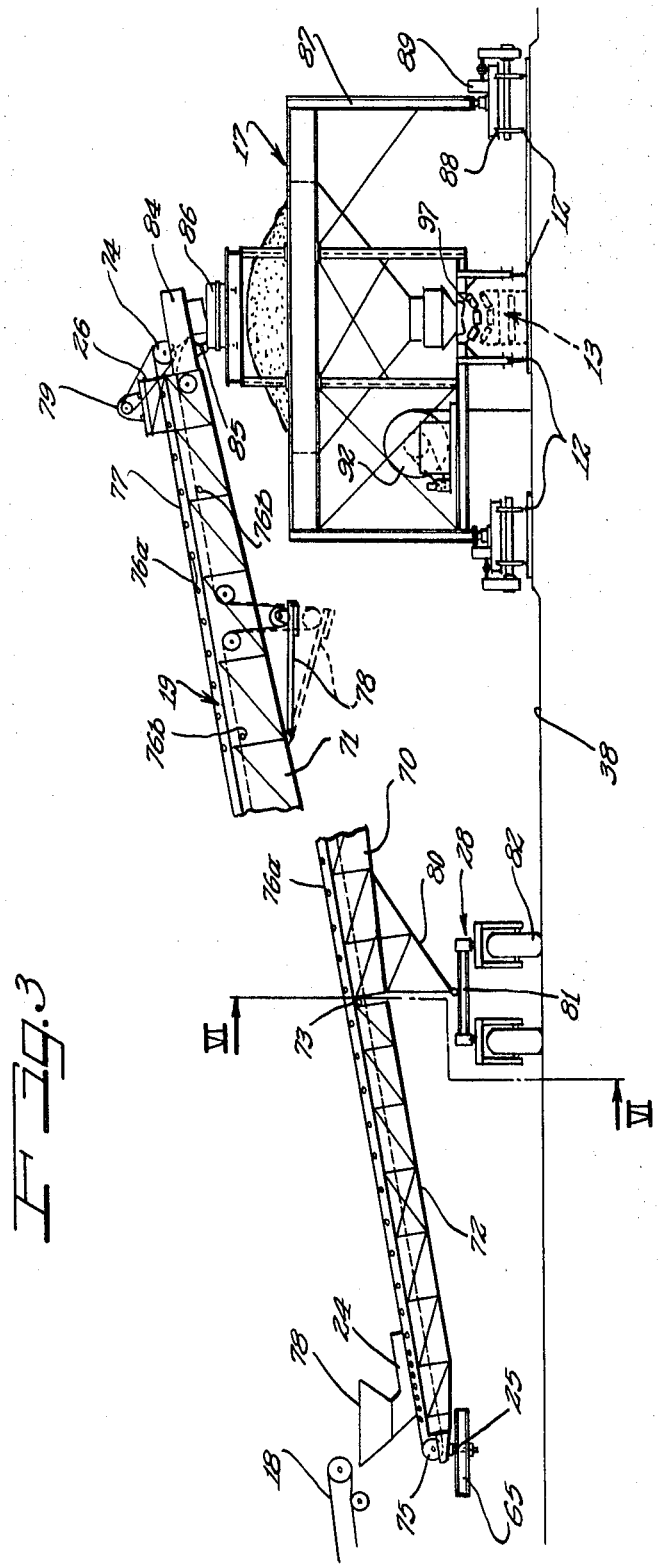

INVENTOR.
Fred T. Smith 3,587,825

JACKKNIFE TYPE CONVEYOR FOR RECLAIMING MATERIAL

BACKGROUND OF THE INVENTION

1. The Field of Invention

The present invention is directed to a jackknife conveyor system particularly adapted to be used with the material-handling device and to a method of digging and conveying material by means of the jackknife conveyor.

2. The Prior Art

Efficient machines have been devised for loosening and removing material of substantial depth in swaths from a face of a large storage pile of loose material or similarly to excavate along a cut such as along or through a hillside or below general terrain levels. Handling of the material after it has been loosened and removed by the machine, then presents a problem. One method of handling the material is to have suitable bulk-handling vehicles such as trucks moving along with the machine to receive the loose material from the boom conveyor extending from the machine. This is an expensive method of handling large quantities of materials because of the large number of vehicles needed as well as drivers for the vehicle. Another proposed system is the mounting of the material-handling device on a large frame which is supported on tracks and which frame extends across the face of the pile. The material-handling device is mounted in the frame for movement along the face of the pile and discharges the dug material into a conveyor carried by the frame. The discharge of the conveyor of the frame is received by a stationary conveyor disposed at one end of the frame. The frame is generally supported on some form of track means which require an extensive installation which requires a large capital investment for handling and reclaiming a pile of bulk material.

Summary of the Invention

The present invention involves a jackknife conveyor for transporting the loosened material from a material-handling device, such as a reclaimer, to a discharge point where the material is transferred to a transport means such as a stationary conveyor system which transports the thus conveyed material to a loading destination. The jackknife conveyor includes a first and second conveyor pivotally attached together with the other end of the first conveyor pivotally attached to the material-handling device and the discharge end of the second conveyor pivotally attached above a loading device which preferably includes a surge bin. The present invention is also directed to a method of transporting loosened material from a pile to a loading means utilizing a jackknife conveyor which enables freedom of movement of the material-handling device as it progresses along a face of the pile.

Accordingly, an important object of the present invention is the provision of the jackknife conveyor for efficiently handling loose material that has been removed from the face of the storage pile and transporting the material to a discharge point.

Another object of the invention is to provide a method and device for efficient intermediate continuous handling of material after it is removed from the material source.

Another object of the present invention is to provide a conveyor structure cooperating with a material-handling device to receive material therefrom and transport it to an unloading point.

A still further object of the present invention is to provide a new improved conveyor for use with a stockpile reclaimer which requires a minimum amount of preinstallation.

Yet another object of the present invention is to provide a novel method for handling material from a material source and to transporting material to a discharge point.

A still further object of the present invention is a conveyor device and method of using same in which the movement of the conveyor means is controlled by the material-handling device and a movable discharge-receiving device disposed at the discharge point.

A still further object of the present invention is a method of handling material, transporting it to a loading station and controlling the amount of material being discharged at the loading station so that the amount of material does not exceed a predetermined maximum quantity per unit of time.

Other objects, features and advantages of the present invention will be readily apparent from the following detailed description of certain preferred embodiments thereof taken in conjunction with the accompanying drawings in which:

FIG. 2 is a side view of the first conveyor means of the present invention extending between a portion of the second conveyor and a material-handling device;

FIG. 3 is a side view of the second conveyor and the discharge device disposed over a stationary loading conveyor;

FIG. 4 is an enlarged view with portions broken away for illustrative purposes of the pivotal connection utilized for connecting the conveyors to the material-handling device and the conveyors to each other;

AS SHOWN ON THE DRAWINGS

Some bulk materials are conveniently stock piled in storage yards near the production site or at an accumulation point where production may be at different sites and the like. For example, salt, crushed stone, coal, iron ore, and other bulk materials that may be stored in large piles may be accommodated in this manner. From the storage piles the material is reclaimed as needed.

Sometimes raw materials are accessible in natural stockpiles so that they can be removed by successive passes along an escarpment in much the same manner as reclaiming material from a storage pile. In addition to mining of minerals in this manner, procurement of earth for roadbed fill, landcuts, and the cutting back of banks in highway construction can be accomplished by a similar method.

The mining of minerals and earth removal may also be effected by trenching techniques when the material is excavated in successive passes along the face of a trench or at least from overhead with the excavating equipment on the floor alongside the bank of the excavation.

Figure 1:
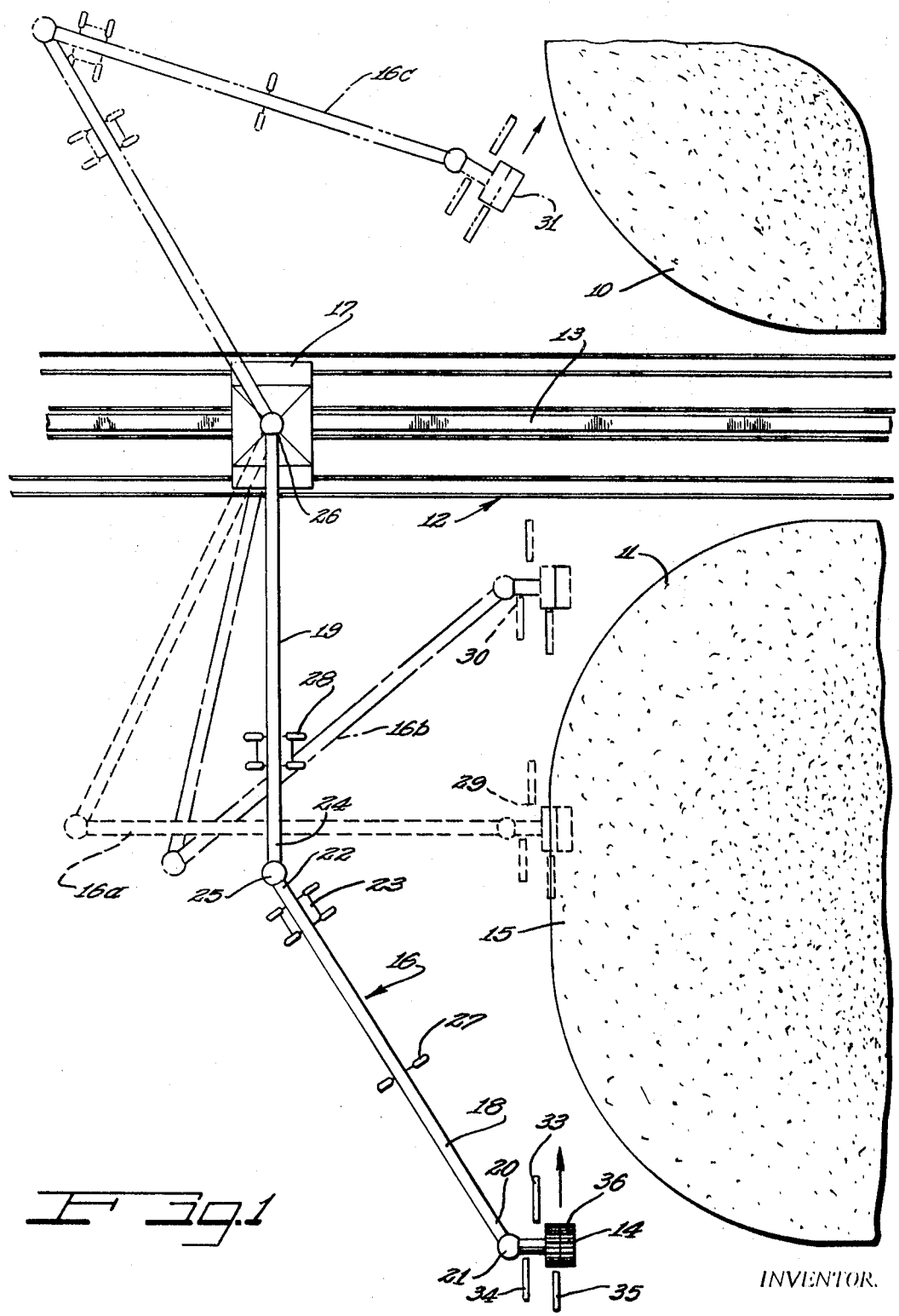
FIG. 1 is a plan view schematically illustrating a material-handling device and conveyor system according to the present invention employed in removing material from storage piles.
Figure 5:
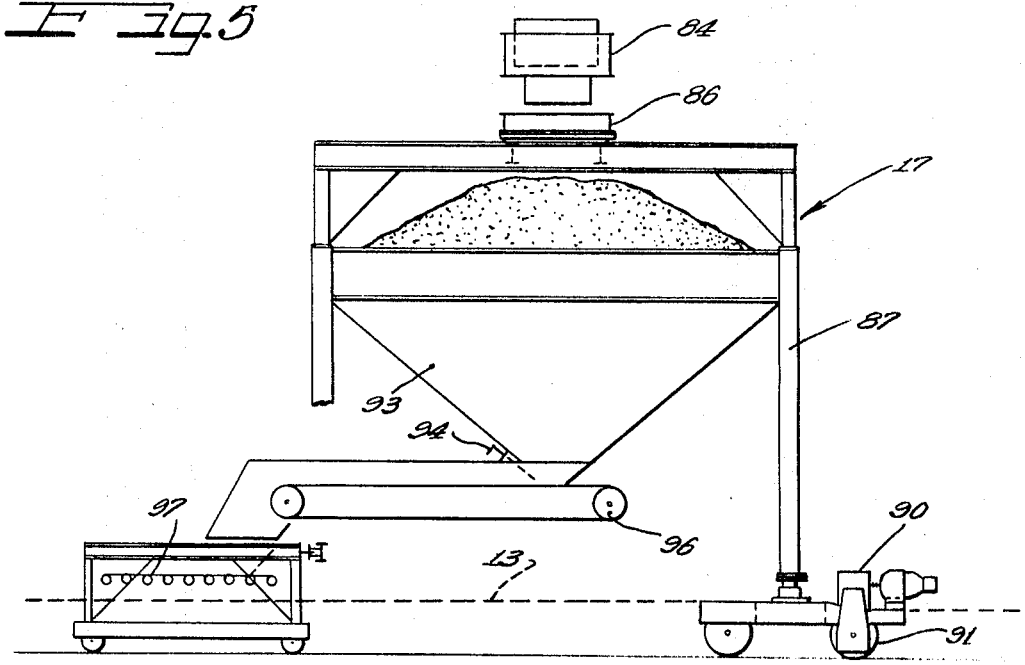
FIG. 5 is an enlarged side view of the discharge device of the present invention.

The principles of the present invention are applicable for the handling of bulk material under several conditions and operations just enumerated as well as others that may suggest themselves or may be found and to which the invention is applicable but for illustrative purposes the invention will be described herein with respect to the reclaiming of bulk materials from a material source such as stockpiles 10 and 11 as illustrated in FIG. 1. Schematically placed between the two piles 10 and 11 is a track system 12 of six rails and a material transport means such as a loading conveyor 13 which may be a stationary conveyor system disposed between the rails of the track system 12.

To obtain the material contained in the material source such as pile 11, a material-handling device 14 which is schematically illustrated as a reclaimer moves along a side face 15 of the pile 11 to dig and lift up the material of the pile. The discharge of the reclaimer 14 is transported by a jackknife conveyor 16 from the reclaimer to a movable discharge device generally indicated at 17. The materials in the discharge device 17 is transferred to the loading conveyor 13 where it is conveyed to a discharge point (not illustrated). Depending upon the type of installation involved, the discharge point may be at the input point of a processing plant such as a blast furnace or it may be at a loading point for barges, ships, or railroad cars.

The jackknife conveyor 16 comprises a first conveyor means 18 and a second conveyor means 19 which are both separately driven. The material receiving end 20 of the first conveyor means 18 is attached to the material-handling device 14 by a pivotal connection 21 and the discharge end 22 of the first conveyor means 18 is supported by a movable support means 23 which has transport means that are illustrated as caster-type wheels. The second conveyor means 19 has a material-receiving end 24 which is attached to the movable support means 23 by a pivotal connection 25 so that the discharge from the first conveyor means 18 is received therein. The discharge end 26 of the second conveyor means 19 is supported in an elevated position by the movable discharge means 17 and is pivotally connected thereto. Preferably, an additional movable frame support means 27 is provided for the first conveyor means 18 and a movable frame support means 28 is provided for the second conveyor means 19 intermediate the ends of the respective conveyor means.

As illustrated in FIG. 1, the material-handling device 14 of the reclaimer moves along the face 15 of the pile 11 to reclaim the bulk material therein. The movement of the reclaimer 14 causes relative angular movement between the first and second conveyor means 18 and 19. The positions 29 and 30 of the reclaimer 14 are illustrated in phantom lines to illustrate the movement of a reclaimer along the face 15 during a reclaiming pass. When the reclaimer has reached the position 29, the jackknife conveyor 16 assumes the position 16a and when the reclaimer has reached position 30, the jackknife conveyor means 16 reaches the position of 16b. By moving the movable discharge device 17 along the track system 12 as the reclaimer makes progressively deeper cuts into the pile 11 during the reclaiming operation, the relative angular position between the first and second conveyor means 18 and 19 of the jackknife conveyor assembly 16 is maintained. The angular position between the first and the second conveyor means is determined by the movement of the reclaimer 14, or by the movement of the discharge device 17, or by the combined movement of both.

If the pile 10 is to be reclaimed, the reclaimer 14 and the jackknife conveyor 16 are positioned as illustrated at 31 and 16c respectively. Since the installation of the conveyor 13 may be such to prevent direct movement of the reclaimer 14 and jackknife conveyor 16 across the track system, the reclaimer and the jackknife conveyor may be disconnected, moved to the new position and reconnected together.

The reclaimer 14 has a main frame 32 which is supported by a three-point suspension comprising a front-transporting propelling means 33 and a pair of rear transporting and propelling means 34 and 35. The transporting and propelling means 33, 34 and 35 are preferably track devices which are independently driven by a power source mounted on the frame 32. The front and rear track device 33—35 are positioned to provide a wheel area for receiving a digging means 36 which, as illustrated in FIG. 2, comprises a pair of aligned digging wheels which dig and lift the material in an arcuate path to be discharged onto an internal conveyor 37 as the reclaimer moves along the cut face 15. The front-transporting propelling means 33 is pivotally attached to the main frame 32 to enable an adjustment of the vertical height of the main frame with respect to the plane 38 of the floor or ground surface and then controls the depth of the cut of the digging means 36. The attachment of the front transporting and propelling means 33 enable turning of the track device about an axis to change the path of the means 33 to steer the reclaimer 14. The rear-transporting and propelling means 35 is also pivotally mounted to the main frame 32 to vary the cutting angle of the digging means 36 by varying or tilting the main frame 32 with respect to the horizontal plane 38 (FIG. 2).

The main frame 32 is provided with an outwardly extending portion or platform 39 on which the first conveyor means 18 is pivotally attached. As best illustrated in FIG. 4, the platform 39 has attached thereto a ball stud 40 of a ball and socket joint which cooperates with a socket 41 attached to the frame 42 of the conveyor means 18, to form the pivotal connection 21.

Figure 6:
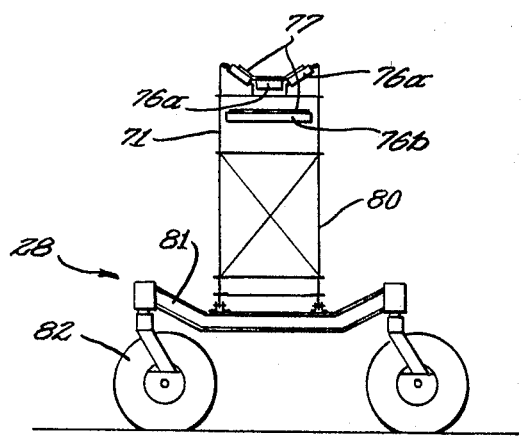
FIG. 6 is a cross section taken along the lines VI–VI of FIG 3.

The frame 42 of the first conveyor means 18 is preferably made up of a frame section 43 and a frame section 44 which are pivotally interconnected at pivot point 45. The frame 42 supports a head roll 46, a foot roll 47, a plurality of upper support rollers 48 and lower support rollers 49. A belt 50 passes between the head and foot rolls 46 and 47 and is supported on the upper support rollers 48 in a troughlike configuration similar to the configuration illustrated in FIG. 6.

The first conveyor means 18 also includes a belt-tensioning means 52 which as illustrated is attached to the frame section 44. The belt-tensioning means 52 comprises an arm 53 pivotally connected to the frame section 44 at one end and supporting a roll 54 which coacts with a pair of rolls 55, 55 to apply a tensioning force on the belt 49 due to the weight of the means 52 and the weight 56 attached to the arm 53. To vary the tensioning force, the position of the weight 56 on the arm 53 can be adjusted or a different size weight can be substituted for the weight 56.

To drive the conveyor belt 50 of the first conveyor means 18, a motor 57 drives the head roll 46 by a belt or chain 58. The motor 57 can be either a hydraulic or electrical motor which receives its source of power from the main power source of the reclaimer 14 by lines (not illustrated) which are either attached along the frame of the conveyor or lying on the ground. The operation of the motor 57 is controlled from the reclaimer by control means (not illustrated).

To aid in the transfer of material from the conveyor 37 of the reclaimer 14, a hopper 59 is placed at the material-receiving end to collect the discharge from the conveyor 37 of the material handling device 14. The construction of the hopper 59 is such that it distributes the material and minimizes spillage of the material from the belt 49.

As mentioned above, the material discharge end 22 of the conveyor means 18 is supported by a movable support means 23 which comprises a frame 61 pivotally connected at 62 to a wheel frame 63. Four wheels 64 are rotatably journaled to the wheel frame 63, one at each of the corners, and the wheels 64 which are preferably large rubber tires, are supported in a casterlike frame structure so that they are free to travel in any path or direction. The frame 61 of the movable support means 23 includes a portion or platform 65 which supports a ball stud for the pivotal connection 25.

The movable frame support 27 has a frame 66 which is supported by two casterlike wheels 67 and is connected to the frame 42 of the first conveyor means 18. The frame support 27 is positioned adjacent to the pivot point 45 and thus maintains the sections 43 and 44 in substantially broomlike configuration while still enabling the connections at the pivot point 45 to compensate for the variations in the ground surface 38. The pivotal connection between the frame sections 43 and 44 also facilitate moving of the conveyor means 18 in a knockdown condition.

The second conveyor means 19 comprises a frame 70 composed of frame sections 71 and 72 which are pivotally connected at pivot point 73. The frame 70 supports head and foot rollers 74 and 75, respectively, and upper and lower belt-supporting rollers 76a and 76b, respectively, which support a conveyor belt 77. The frame also is provided with a hopper 78 for collecting discharge from the first conveyor system 18 and facilitating the distribution of the material on the belt 77 of the second conveyor means 19. The second conveyor means includes a conveyor belt-tensioning means 78 and a conveyor belt drive means 79 both of which are similar to those previously described.

The movable frame support 28 includes a frame 80 pivotally attached to a wheel frame 81 in which four casterlike wheels 82 are rotatably journaled. The frame support 28 is positioned adjacent to the pivot point 73 to provide support to the frame sections 71 and 72 while enabling compensation for irregularities in the planar surface of the ground 38.

The discharge end 26 of the second conveyor means 19 includes a chute 84 which is attached by pivotal connection 85 to a ring 86 of the discharge device 17 which includes a frame 87 mounted on trucks 88 which move on the track system 12.

The trucks 88 are provided with a motive source 89 which as illustrated comprises electric motors connected to a gear reduction box 90 to drive the wheels 91 of the trucks 88. In the preferred embodiment the power source for the electric motor is supplied by the reclaimer through a trailing cable which is connected to and stored on a takeup reel 92. The operator of the reclaimer, also controls the motive source through the ground cable.

Preferably, the movable discharge means 17 includes a surge bin 93 which receives the material discharge through the chute 84 of the second conveyor means. The ring 86 is rotatably supported above the surge bin 93 by the frame 87 and allows rotational movement of the jackknife conveyor system 16 with respect to the discharge means 17.

The surge bin 93 is provided with a discharge control means 94 for controlling the discharge from the surge bin 93. The discharge control 94 is illustrated as a gate-type valve which opens onto a conveyor 96 which in the preferred construction discharges on a traveling nest of impact idlers 97 which breaks up any large pieces of bulk material and is disposed above the loading conveyor 13. The frame of the traveling nest of impact idlers 97 is attached to frame 87 of the movable discharge means 17 so that the impact rollers move with the device 17.

By adjusting the discharge control means 97, the discharge flow rate from the surge bin 93 can be selected to be less than a predetermined maximum rate. Therefore, the size of the loading conveyor 13 can be selected to be smaller than the size necessary to handle the maximum or surge flow rates of the material being transported on the jackknife conveyor system 16. In some instances it may be desirable to dispense with the surge bin 93 and merely discharge the output of the jackknife conveyor assembly 16 directly on the loading conveyor 13. However, the capacity of the loading conveyor 13 must be selected to handle the surges which will occur during the reclaiming of the pile 11.

In operation, the reclaimer 14 moves along the space 15 of the pile 11 to dig and lift the material into the internal conveyor 37 which discharges into the jackknife conveyor system 16. The material is then transported by the jackknife conveyor system 16 to the discharge device 17 where control means 94 meters or regulates the flow discharge from the surge bin 93. If surge bin is selected to have sufficient size and the discharge flow properly regulated by the control means 94, the discharge from the surge bin can be constant even though the reclaimer is not digging any material during its movement from point or position 30 to the starting position for the next cutting or digging pass. Therefore, the inclusion of the surge bin 93 and discharge central 94 enables the operator to maintain a constant discharge flow rate into the conveyor belt 13 which flow rate may be critical if the material is being mixed with other materials at the discharge point of the conveyor 13.

The utilization of a jackknife conveyor assembly 16 with a material handling device 14 enables greater flexibility in the operation of the material handling device while reclaiming material from the pile 11 or while excavating material from one of the above-mentioned sources of material. Thus, one advantage of the present invention is enabling a material handling device to move along a path which can be parallel with the track system 12 or at any angle thereto. The material handling device 14 can therefore, be used to clean up the trailings after the majority of the pile has been reclaimed.

Although various minor modifications might be suggested by those versed in the art, it should be understood that I wish to employ within the scope of the patent warranted hereon, all such embodiments as reasonably and properly come within the scope of my contribution to the art.

I claim:

1. An apparatus for obtaining and transporting material from a source of bulk material comprising:
    a material-handling device having a frame with longitudinally spaced transporting and propelling means,
    a digging wheel disposed for rotation on one side of said frame about an axis substantially transverse to the frame, internal conveyor means extending into the interior of the digging wheel means for receiving material dug thereby and transporting it across the frame and discharging it from the other side of said frame;
    a first conveyor means having a material discharge end and a material-receiving end, said first conveyor means including a first frame having means adjacent said material-receiving end for pivotally attaching said conveyor means to said material handling device to form a pivotal connection therebetween for maintaining the material-receiving end of said first conveyor means in a position to receive the material-discharged by said internal conveyor means;
    a support means attached to said first frame adjacent to the material discharge end for supporting said material discharge end in an elevated position, said support means including transport means enabling movement in any direction;
    a second conveyor means having a material discharge end and a material-receiving end, said second conveyor means including a second frame having means at said material-receiving end for pivotally securing said second frame to said support means to form a pivotal connection therebetween for maintaining the material-receiving end of the second conveyor means beneath the discharge end of the first conveyor means, during any movement of said support means; and
    a material discharge means having a pivotal connection to a discharge end of said second conveyor means, said material discharge means being adapted for movement along a predetermined path for discharging the material transported by said first and second conveyor means onto a loading conveyor,
    said pivotal connections enabling relative angular movement between said material handling device and said first conveyor means, and between said first and second conveyor means as the material-handling device moves during its operation.

2. An apparatus for obtaining and transporting material from a source of bulk material comprising:
    a material-handling device having a frame with longitudinally spaced transporting and propelling means;
    a digging wheel disposed for rotation on one side of said frame about an axis substantially transverse to the frame, internal conveyor means extending into the interior of the digging wheel means for receiving material dug thereby and transporting it across the frame and discharging it from the other side of said frame;
    a first conveyor means having a material discharge end and a material receiving end, said first conveyor means including a first frame having means adjacent said material receiving end for pivotally attaching said conveyor means to said material-handling device to form a pivotal connection therebetween for maintaining the material-receiving end of said first conveyor means in a position to receive the material discharged by said internal conveyor means;
    a support means attached to said first frame adjacent to the material discharge end, said support means having pivotal transport means to enable movement in any direction and a frame for supporting said material discharge end in an elevated position;
    a second conveyor means having a material discharge end and a material receiving end, said second conveyor means including a second frame having means at said material-receiving end for pivotally securing said second frame to said support means beneath the discharge end of the first conveyor means to form a pivotal connection therebetween and for maintaining the material-receiving end of said second conveyor means beneath the discharge end of the first conveyor means during any movement of said support means; and
    a material-holding means for receiving material from the second conveyor means having means forming a pivotal connection with the discharge end of said second conveyor means, said material-holding means including means for regulating the output therefrom so that the flow rate of the output has a predetermined maximum rate regardless of the variation in the rate of discharge of the material from said second conveyor means, said pivotal connections enabling relative angular movement between said first and second conveyor means to enable freedom of movement of the material-handling device during its operation.

3. An apparatus according to claim 2 which further includes support means disposed on each of the frames of said first and second conveyor means between the ends thereof, said support means including pivotal transport means to enable movement of the support means in any direction so that said support means enable relative angular movement between said conveyor means as said material-handling device moves.

4. An apparatus according to claim 3 wherein one of said frames of said first and second conveyor means comprises frame sections interconnected at a pivot point, and which includes movable frame support means for said one frame disposed on said one frame adjacent said pivot point so that said one frame enables compensation for irregularity in the plane of the ground surface.

5. An apparatus according to claim 4, wherein said frame having said pivot point includes means for maintaining a preselected tension on the belt of the conveyor means so that during any movement of said frame section said means for maintaining a preselected tension compensate for increases and decreases in the path of the conveyor belt.

6. An apparatus for obtaining and transporting material from a source of bulk material comprising:
- a material-handling device having a frame longitudinally spaced transporting and propelling means,
- a digging wheel disposed for rotation on one side of said frame about an axis substantially transverse to the frame, internal conveyor means extending into the interior of the digging wheel means for receiving material dug thereby and transporting it across the frame and discharging it from the other side of said frame;
- a first and second conveyor means each having a discharge end and a material-receiving end, each of said conveyor means including a frame with at least one of said frames including frame sections pivotally interconnected at a pivot point and having a frame support means disposed at said pivot point, said frame support means including transport means enabling movement of said one frame in any direction, said frame of said first conveyor means including means forming a pivotal connection with the frame of the material handling device to maintain the material-receiving end of the first conveyor means in a position to receive the material discharged by said internal conveyor means;
- a movable support means including a frame for maintaining the discharge end of the first conveyor means in an elevated position above the material receiving end of the second conveyor means, and means for forming a pivotal connection with one of said conveyor means so that the material-receiving end of the second conveyor means is always disposed beneath the discharge end of the first conveyor means regardless of the angular movement between said conveyor means, and
- means supporting the discharge end of the second conveyor means in an elevated position for discharging material into a material transporting means, whereby said pivotal connection enables freedom of movement of the material-handling device during its operation and said pivot point enables the conveyors to compensate for irregularities in the ground surface.

7. An apparatus according to claim 6 wherein one of said frame sections includes a conveyor belt tensioning means for applying a preselected tensioning force on the belt of the conveyor means so that the preselected tensioning force compensates for any variations in the length of the path of the belt as the frame section compensates for any variations in the ground surface.